M. HARTER.
Evaporator for Saccharine Liquids.
No. 35,679.    Patented June 24, 1862.
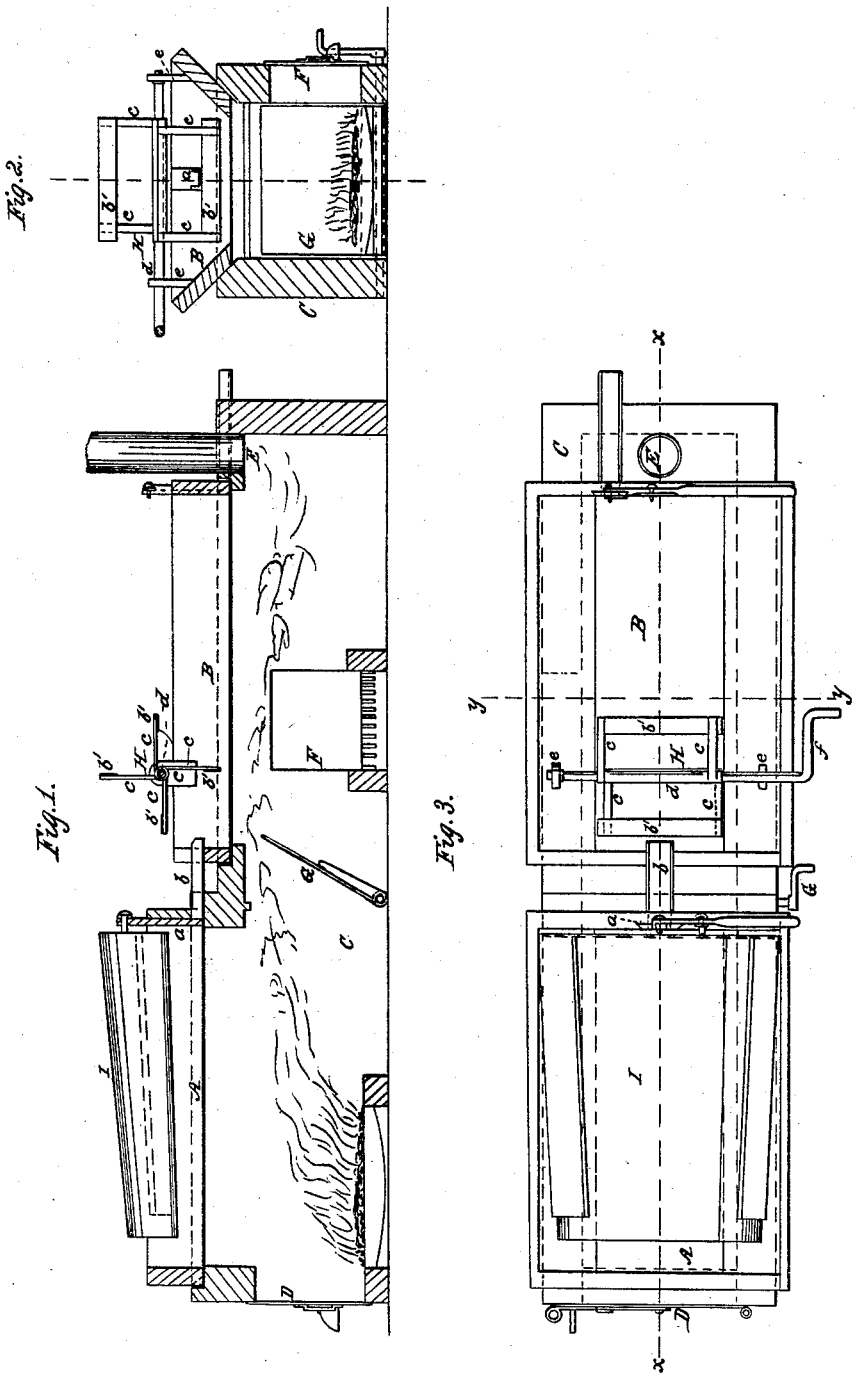
Witnesses:    Inventor:

UNITED STATES PATENT OFFICE.

M. HARTER, OF INDEPENDENCE, IOWA.

IMPROVEMENT IN EVAPORATING SACCHARINE LIQUIDS.

Specification forming part of Letters Patent No. 35,679, dated June 24, 1862.

*To all whom it may concern:*

Be it known that I, M. HARTER, of Independence, in the county of Buchanan and State of Iowa, have invented a new and Improved Evaporator for Saccharine Liquids, &c.; and I do hereby declare that the following is a full, clear, and exact description of the same, reference being had to the accompanying drawings, forming a part of this specification, in which—

Figure 1 represents a longitudinal vertical section of my invention, the line $x\ x$, Fig. 3, indicating the plane of section. Fig. 2 is a transverse vertical section of the same, taken on the plane indicated by the line $y\ y$, Fig. 3. Fig. 3 is a plan or top view of the same.

Similar letters of reference in the three views indicate corresponding parts.

The object of this invention is to arrange the several pans which constitute the evaporator in such relation to each other and to the furnace that one batch of juice or liquid can be completely finished before introducing some fresh juice.

This invention consists in the arrangement of a secondary fire-door under the finishing-pan, which is placed lower than the first or condensing pan, and communicates with the same through a gate, in combination with one common flue, and with a damper between the two doors in such a manner that by said secondary fire-door and by the aid of the damper the heat under the finishing-pan can be regulated at pleasure without interrupting the action of the main fire on the first pan.

It consists, further, in the employment or use of a rotary agitator in the finishing-pan in such a manner that the burning or overheating of the juice can be effectually prevented.

It consists, further, in the arrangement of a convex movable cover or condenser, in combination with the first pan, in such a manner that the evaporation of the juice is facilitated and a larger quantity of fuel can be saved.

To enable those skilled in the art to make and use my invention, I will proceed to describe it with reference to the drawings.

Two pans, A B, are placed on the furnace or flue C, which extends from the main fire-door D to the chimney E. The pans are made of sheet metal or other suitable material, with flaring sides to prevent the juice boiling over, and the pan A is placed so much higher than the pan B that the contents of the same can be run off into the pan B. The two pans communicate with each other by a gate, $a$, and spout $b$, so that the juice from pan A can readily be run into pan B. The furnace or flue C is built up of brick, or it may be made portable of sheet-iron or other suitable material, and it is furnished with a side fire-door, F, and a damper, G, between the main fire-door D and the side fire-door, F. The main fire is built under the first pan, A, and when the damper is open it heats the contents of both pans, which, at the beginning of the operation, are both filled with raw juice from the juice-tanks. When about half boiled down the contents of the first pan are run off into the second pan and immediately replaced by raw juice, and the boiling of the fresh batch is finished in the second pan, B, and then drawn off into a suitable receptacle. By this time the contents of the first pan are about half boiled, and they are now let down into the second pan; but in order to prevent it being burned while passing into the second pan, the damper G is closed and fresh bagasse is put under the pan B through the side fire-door, F. By these means the heat under the pan B can be so regulated that the danger of burning the juice is avoided. The finishing-pan B is provided with an agitator, H, which consists of a series of floats, $b'$, attached to arms $c$, which extend from or are secured to a rotary shaft, $d$. This shaft has its bearings in two standards, $e$, rising from the sides of the pan, and it is operated by a crank, $f$, or by any other convenient means. The agitator H is placed close to the spout $b$, which carries the juice from the first to the second pan, and by its action no part of the juice is permitted to remain in contact with the heated bottom of the pan long enough to become burned.

The evaporation of the juice in the first pan is furthermore considerably facilitated by the use of a convex cover, I, which is placed over the first pan, and which is made so as to collect and carry off the condensed steam, while an opening at one end is left for the purpose of removing the scum which collects there.

By the use of my evaporator the juice can be boiled down and each batch finished without being compelled to mix it with raw juice, and a better quality of molasses is thereby produced than with ordinary evaporators, and furthermore the heat can be so regulated that the burning of the juice is avoided, and that the evaporation can be effected with less fuel in proportion to the quantity used with evaporators of the ordinary construction.

What I claim as new, and desire to secure by Letters Patent, is—

1. The arrangement of the secondary fire-door F in the side of the flue C, in combination with the damper G, placed between the door F and the main fire-door D, and with the pans A B, all constructed and operating in the manner and for the purpose described.

2. The employment or use of the rotary agitator H, in combination with the evaporating-pan B, as specified.

3. The arrangement of the convex cover I, in combination with the pan A, as and for the purpose set forth.

M. HARTER.

Witnesses:
   E. FINNEGAN,
   S. S. WELCH,
   IRA ALEXANDER,
   HORACE WALLACE.